INVENTORS
JOHN W. GRAY
GEORGE W. MICHALEC

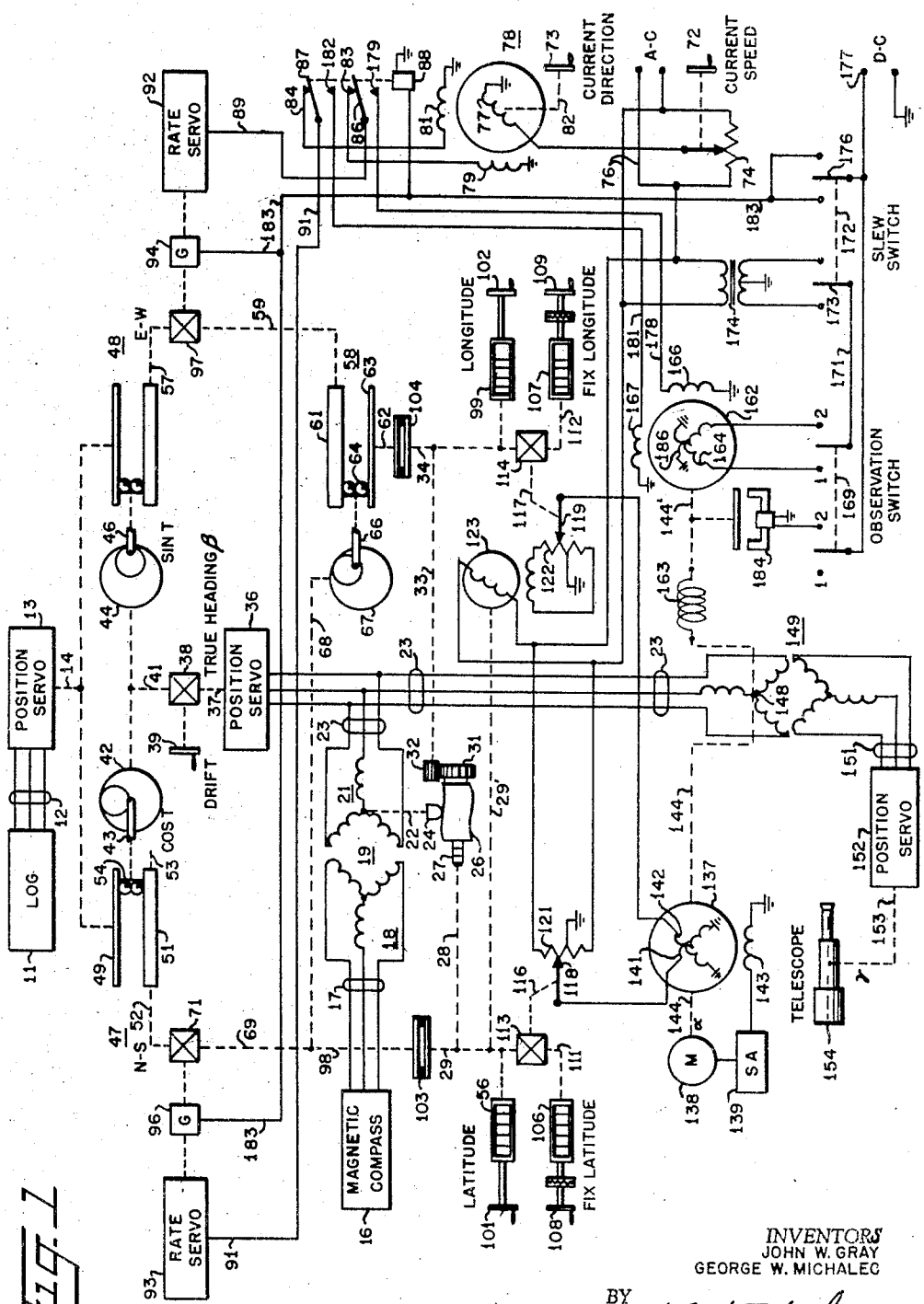

United States Patent Office 2,882,602
Patented Apr. 21, 1959

2,882,602

FIX CORRECTOR FOR MARINE AUTOMATIC DEAD RECKONING

John W. Gray and George W. Michalec, Pleasantville, N.Y., assignors to General Precision Laboratory Incorporated, a corporation of New York Application January 23, 1957, Serial No. 635,892

4 Claims. (Cl. 33—46)

This invention relates to devices for automatically and continuously reckoning the position of a marine vessel or other craft in which the reckoned position is corrected by direct observation of an object on land or sea having known position.

In ocean navigation, as an example, it is often necessary to compute the present position of the ship from the position which it had at some earlier point of the journey. In making this computation knowledge is required of ship's speed and heading and the velocities of ocean currents and tides. However, uncertainties in these data cause errors in the computed positions which are cumulative and may be serious when dead reckoning is continued over a long distance. Therefore it is usual to make celestial or terrestrial observations whenever possible to check the dead reckoning position. This is particularly important when nearing land after a long period of dead reckoning.

The present invention includes apparatus for automatically correcting a dead reckoning position by visual or radar observation of a known terrestrial object such as a landmark or lightship. The invention is employed with dead reckoning equipment displaying present latitude and longitude on indicators, and includes a telescope or equivalent equipment with provision for training on an object having known position. In the process of training the telescope or other equipment on the known object the present latitude and longitude indicators are automatically corrected. Two consecutive training operations are required in order to find the fix position by what is effectively an automatic trigonometric process.

The principal object of this invention is to provide marine automatic dead reckoning equipment with correction by terrestrial observation.

Another object of this invention is to provide equipment for correcting a dead reckoning position by two observations at different azimuth angles of a known object.

Further understanding of this invnention may be secured by reference to the detailed description and drawings, in which:

Figure 1 is a mechanical and electrical schematic drawing of the instrument of the invention.

Figure 2:
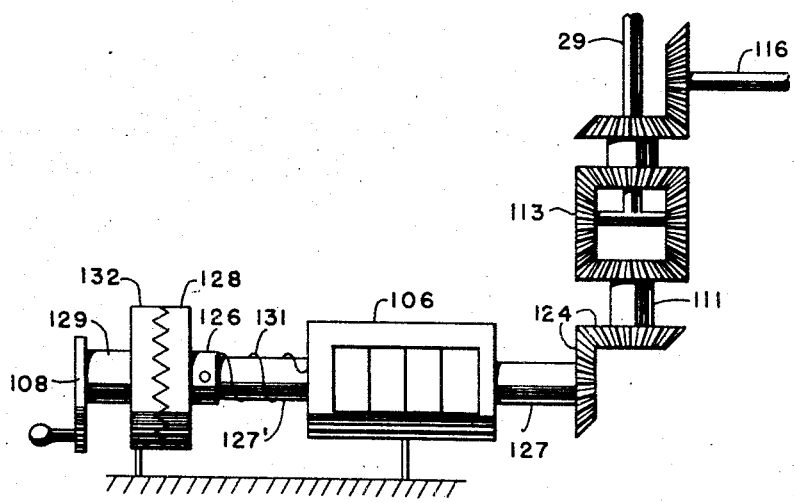

Figure 2 schematically illustrates the construction of the two fix counters and associated parts.

Figure 3:
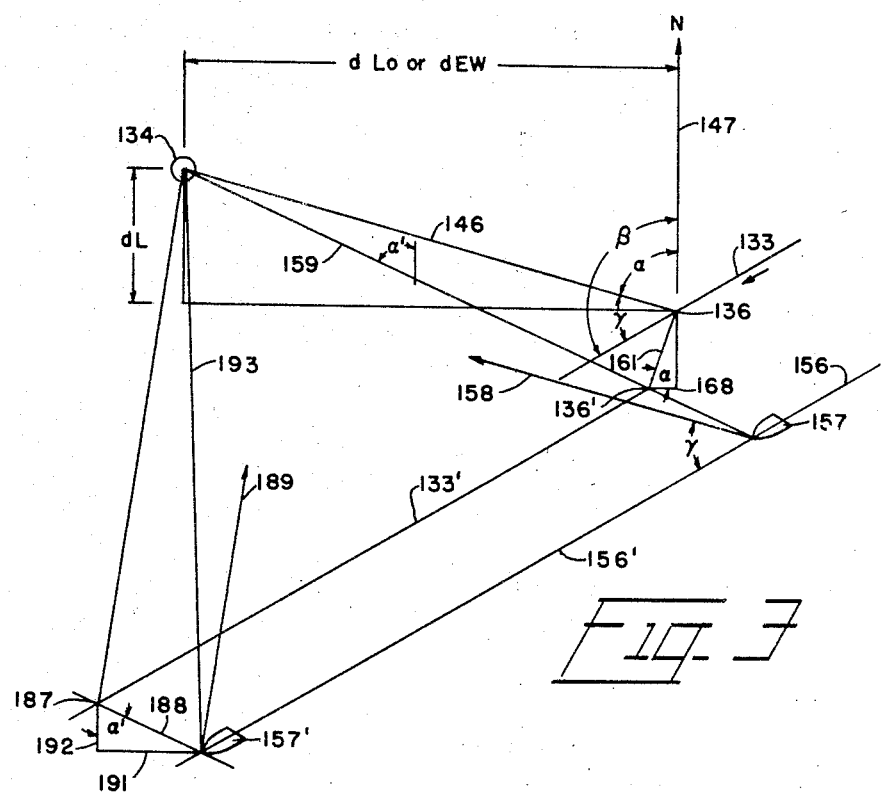

Figure 3 depicts the geometry underlying the design of this invention.

Referring now to Fig. 1, a taffrail log 11 on a marine vessel is equipped with a three-wire synchro transmitter for transmitting a signal through the three conductors 12. The angular displacement of the space phase of this signal represents the distance travelled by the vessel, and the speed of change of the space phase represents the vessel's speed. In place of a taffrail log any other equivalent device may be employed if its output is in the form of a synchro data transmission system signal, such an equivalent device comprising, for example, a propeller shaft revolution counter or a marine speedometer.

The electrical signal transmitted by conductors 12 is transformed by a position servomechanism 13 to an equivalent rotation of shaft 14. The total angular displacement of this shaft from an initial angular position represents distance travelled by the vessel, and the instantaneous shaft speed represents instantaneous ship's speed.

A magnetic compass 16 includes a synchro data transmitter so that the space phase of its electrical output signal in conductors 17 represents the magnetic compass heading of the vessel. The conductors 17 are connected to one winding 18 of a synchro differential 19 having a second winding 21. This winding 21 is physically rotatable in relation to winding 19 by shaft 22, so that the output signal from winding 21 at conductors 23 is shifted in space phase relative to the signal in conductors 17 by the amount of angular displacement of shaft 22. Shaft 22 is rotated by a cam follower 24 bearing on the surface of a three-dimensional cam 26. This cam represents by its contours the variation of magnetic declination over the entire navigable surface of the earth, so that to the heading angle represented by the signal in conductors 17 there is added the local magnetic variation angle to form in conductors 23 a signal representing true heading. The cam 26 is positioned axially by means of a screw 27 which is positioned in accordance with the present latitude through shaft 28 from a present latitude shaft 29. The cam 26 is also positioned circumferentially through gear 31, pinion 32 and shaft 33 from a present longitude shaft 34. The positioning of the present latitude and present longitude shafts are described hereinafter.

The conductors 23 are connected to actuate a position servomechanism 36 which therefore has an output angular displacement at shaft 37 representing the true heading angle of the vessel. Shaft 37 is connected to a differential gear 38 by means of which the drift angle is manually added by hand crank 39, the drift angle being ascertained by conventional means. The angular position of the output shaft 41 of the differential 38 then represents the azimuth of the track of the vessel relative to true north.

A linear displacement representing the cosine of the track angle is secured by a cosine generator 42. This device is rotated by shaft 41 to produce a reciprocating linear displacement of the output shaft 43 which is proportional to the cosine of the input angular displacement. This cosine generator may take any one of several forms. For example, it may be constructed as taught in Patent No. 2,628,024, entitled Squaring Device, of Ivan A. Greenwood, Jr., issued February 10, 1953, which employs an external gear meshing with an internal gear of twice the diameter. This device generates either the sine or the cosin function, depending on the zero setting.

The relation of the linear displacement $x$ of shaft 43 to the angular displacement T of shaft 41 is $$x = r \cos T \qquad (1)$$

in which $r$ is the effective radius of the device.

A similar device is employed as a sine generating device 44. The output shaft 46 has a displacement proportional to the sine of the displacement of shaft 41.

The rotation of shaft 14 is applied to two similar variable speed drives 47 and 48 of the type sometimes termed ball-and-disc integrators. The drive 47 comprises a disc 49 driven by shaft 14. A cylinder 51 is arranged to rotate on its axial journals 52 and 53, and is mechanically connected to the disc for rotation by it through two balls in a cage 54. The cage is positioned radially on the disc by connection to the shaft 43. The position of the ball cage therefore represents cos T. Inspection shows that the angular displacement D of the cylinder 52 is $$D = \frac{dr \cos T}{R} \qquad (2)$$

in which $d$ is the angular displacement of the disc and R is the radius of the drum. That is, the drum displacement at its journal shaft 52 is proportional to the displacement of shaft 14 multiplied by the cosine of the track angle. But since the displacement of shaft 14 from a selected datum position represents the respective distance travelled by the vessel from a corresponding starting position, and since the track azimuth is measured from the north direction, the displacement of shaft 52 represents the north-south component of distance travelled. Constants are chosen so that the distance is indicated in degrees of latitude, and a counter 56 is provided so indicating.

In a similar manner the output shaft 57 of drive 48 represents by its angular displacement the east-west component of distance travelled by the vessel. However, since degrees of longitude are not fixed in length, it is necessary to divide the displacement of shaft 57 by the cosine of latitude to convert its indication to longitude indication. This is done in variable speed drive 58 with the input shaft 59 connected to rotate the drum 61 and with output taken at shaft 62 from the disc 63. The ball cage 64 is positioned in terms of cosine latitude (cos $L$) by the shaft 66 of a cosine generator 67 which is driven through shafts 68 and 69 and differential 71 from shaft 52. The equation for drive 58 is, $$d' = \frac{R'D'}{r' \cos L} \quad (3)$$

in which $d'$ is the displacement of disc 63, $D'$ is the displacement of drum 61, $R'$ is the radius of the drum 61 and $r'$ is the effective radius of the cosine device 67.

Ocean currents and tides as ascertained from tables are corrected for by manual insertion at hand crank 72 for current speed and crank 73 for current direction angle relative to true north. Crank 72 positions a voltage divider 74 energized from alternating current mains 76 to excite the rotor coil 77 of a resolver 78. The resolver 78 has two orthogonal stator coils 79 and 81 and is positioned relative to them by the crank 73 which, through shaft 82 rotates the resolver rotor. The output voltages of coils 79 and 81 therefore represent the east-west and north-south velocity components, respectively, of the ocean current which was set in. These components are conducted through the back contacts 83 and 84 and contact armatures 86 and 87 of a relay 88 and through conductors 89 and 91 to rate servomechanisms 92 and 93. These servomechanisms are connected through gears 94 and 96 to drive differential gears 97 and 71, thereby adding to the motions of shafts 57 and 52 the shaft rates representing the ocean current components. It is to be noted that in these additions it is the angular velocities of shafts 52 and 57 which are considered rather than their angular displacements.

To recapitulate, the angular displacements of shafts 98 and 62 represent the corrected distances travelled by the vessel in the north-south and east-west directions, respectively, in terms of latitude and longitude degrees. The speeds of these shafts represent component vessel speeds, but are not made use of in this instrumentation except as described above in correcting for ocean currents.

The component distances are displayed on latitude counter 56 and longitude counter 99. These counters are provided with resetting handles 101 and 102 by which they can be moved forward or backward, so that the latitude and longitude of the starting point of the vessel's travel can be set in before starting the voyage. In order to avoid putting torque on the servomotor gears when setting the counters, slip clutches 103 and 104 are provided.

As previously stated, errors may be expected in the dead recokoned position indicated by counters 56 and 99. In order to correct these indications the equipment and circuits represented by the remaining part of Fig. 1 are provided.

This equipment includes fix position counters 106 and 107, which are provided with setting handles 108 and 109. The shafts 111 and 112 of these counters are connected through differential gears 113 and 114 to the latitude and longitude shafts 29 and 34 respectively. The third mechanical terminals 116 and 117 of the differential gears are connected to sliders 118 and 119 of voltage dividers 121 and 122. These voltage dividers are of the rotating type and although they have limited electrical range, they have no mechanical stops and can be continuously rotated mechanically. Voltage divider 121 is electrically energized directly from the alternating current mains 76, while voltage divider 122 is energized from these mains through a resolver 123 which is so rotated by shaft 29' connected to and operated by shaft 29 as to multiply the input potential by the cosine of latitude, converting the output of voltage divider 122 from a longitude degree frame of reference to an east-west scalar distance frame of reference.

In operation of the differential gears 113 and 114 the inputs may be either the latitude and longitude shafts 29 and 34 or the fix counter shafts 111 and 112. In either case the voltage divider shafts 116 and 117 are the output shafts and the differentials perform the function of algebraic subtraction. In order to operate in this manner it is necessary that the torque resistance of the voltage divider shaft be less than that of the latitude or longitude counter shaft, and a lock is required on the fix counter shaft.

The operation of this lock is shown in Fig. 2, in which fix counter 106 is connected through shaft 127, bevel gears 124 and shaft 111 to the differential gears 113, which are also connected to the latitude shaft 29 and the voltage divider shaft 116. The setting crank 108 is secured through its shaft 129 and a spring-loaded sliding spine 126 to the end 127' of fix counter shaft 127. A serrated wheel 128 is secured to the spline sleeve and to the shaft 129 by crank 108. The wheel 128 is urged to the left by spring 131 so that it engages a fixed serrated wheel 132. This engagement immobilizes and locks the crank 108, fix counter 106 and differential shaft 111. When crank 108 is pushed to the right against spring 131 it disengages serrated wheel 128 from fixed serrated wheel 132. If crank 108 then be turned it will set counter 106. It will also rotate shaft 127, bevel gears 124, differential shaft 111 and voltage divider shaft 116, rotating the voltage divider slider 118, Fig. 1.

The construction and operation of the longitude gear differential 114 and fix counter 107 are similar. Adjustments of the gear differential shafts and of the voltage dividers are such that when the two counters, such as counters 56 and 106, read alike, the voltage divider slider 118 is at its grounded center or zero point.

Figure 3 illustrates the method of correcting dead reckoning position by two observations of an object the location of which is known. The line 133 represents the track of a vessel as estimated by dead reckoning, with an object such as a light-house upon which a fix is to be taken indicated by the mark 134. The first step in taking a fix on the object 134 consists of setting the known latitude of the object on fix counter 106, Fig. 1, and the known longitude on fix counter 107. When the vessel reaches the dead reckoned point 136, Fig. 3, the latitude difference between the positions 134 and 136 is shown in Fig. 3 by the distance $dL$ and is indicated by the difference in readings of counters 56 and 106, Fig. 1. The voltage at slider 118 is proportional to this difference and therefore represents it. Similarly, the longitude difference, $dLo$, Fig. 3, is indicated by the difference of counters 99 and 107, Fig. 1. However, since the voltage output of slider 119 partly depends on the voltage input, which is a function of cosine latitude, the slider 119 voltage represents the longitude distance $dLo$ multiplied by cosine latitude resulting in a linear measure of distance rather than measurement in terms of longitude degrees, and may be termed $d$EW.

The resolver 137 contains two orthogonal windings 141 and 142 to which are applied voltages impressed on sliders 118 and 119. The composite field of windings 141 and 142 generates a voltage in stator winding 143. This voltage after amplification by the servoamplifier 139 is applied to a motor 138. The rotation of the shaft 144 of this motor is in such direction as to drive the rotor 137 of the resolver to bring the field applied to winding 143 to zero. The resultant of the orthogonal fields of windings 141 and 142 will then be perpendicular to winding 143. Since the voltages of sliders 118 and 119 represent $d$L and $d$EW and considering the distances $d$L and $d$EW, Fig. 3, as vectors, the angle $\alpha$ of the difference vector 146 relative to the true north direction 147 is then represented by the angular deflection of shaft 144, Fig. 1, from a datum position. Stated another way the resolver 137 constitutes an arc tangent solver since through the medium of the feedback path consisting of winding 143, amplifier 139 and motor 138 the shaft 144 is oriented at an angle such that the tangent thereof is equal to the quotient of the voltages of sliders 119 and 118, i.e., $$\frac{dEW}{dL} = \tan \alpha$$

This angle $\alpha$ is the true azimuth angle of the position 134, Fig. 3, of the lighthouse.

Shaft 144, Fig. 1, is connected to the rotor 148 of a differential synchro 149, which is excited from conductors 23 bearing a signal representing the heading angle of the vessel relative to true north. This heading angle is represented in Fig. 3 by angle $\beta$. The differential synchro 149, Fig. 1, algebraically subtracts $\alpha$ and $\beta$ to form a signal in its output conductors 151 representing the angle $\gamma$ depicted in Fig. 3 as the angle between the lubber line of the vessel and the supposed or dead reckoned direction to the lighthouse 134. This angle $\gamma$ is termed the relative bearing of the lighthouse, or its bearing relative to the vessel's heading.

The output conductors 151 are connected to energize a position servomechanism 152 which converts the electrical signal into an angular deflection of a mechanical shaft 153 having the magnitude $\gamma$. Shaft 153 is connected to position a telescope 154 to angle $\gamma$ in the horizontal plane relative to the vessel's lubber line.

A telescope is specified as performing this function merely by way of illustration, as any other device well known in the art, such as a pelorus, or any of sundry other devices for discerning the geometric relation of a fixed object may be employed instead.

In the employment of telescope 154, if the vessel actually be at the dead reckoned position 136, Fig. 3, the direction relative to the vessel assumed by the telescope would indeed be that of line 146, and upon looking through the telescope the lighthouse would be seen centered therein. If, however, as generally will be true, the dead reckoning is in error, then generally the telescope direction will not be in the direction of the lighthouse. This is illustrated in Fig. 3, in which the line 156 represents the actual path of the vessel and the point of symbol 157 represents the actual position of the vessel at the time when a sight is taken through the telescope. Since the telescope is parallel to the line 146 and the track 156 is parallel to the dead reckoned track 133, the line of sight 158 at angle $\gamma$ is parallel to line 146 and misses the target lighthouse.

It is to be noted that the continuing rotations of latitude and longitude shafts 29 and 34, Fig. 1, after the fix counters have been set, continuously change the geometric components of Fig. 3 but that the lines 146 and 158 remain parallel.

It is now desired to move the telescope to bear on the lighthouse and in so doing to correct the dead reckoning position to the true position. This is done in two steps, the first of which effectively moves the dead reckoned position 136 in a direction normal to line 146, and the second of which again moves the position orthogonally, to the true position. Thus the two moves are at right angles to each other and constitute two orthogonal components of the distance 136—157.

It is desired to move the dead reckoned position 136 to a new position lying on a line between the telescope position 157 and the lighthouse 134. If this be done then the lines 146 and 158, if they maintain parallelism as they must will become coincident and the telescope will point to the lighthouse. The location 136 is accordingly moved by the shortest route to the line 159. The route of movement 161 is perpendicular to both 146 and 159, being actually an arc about point 134.

To accomplish the movement of the dead reckoned location 136 to the position 136' a resolver 162, Fig. 1, is positioned by shaft 144 through a spring 163 and shaft 144' to a position representing, relative to true north, the angle $\alpha$. The spring 163 is an angular displacement storage device having a center zero which, when its load is substantially zero, transmits the angular position of shaft 144 to shaft 144' with fidelity. This is the case in the present action. The field of rotor winding 164 of resolver 162 is thus positioned to represent the angle $\alpha$. The orthogonal stator windings 166 and 167 are so positioned as to have potentials induced in them by the current in winding 164 which are respectively representative of the cosine and sine of the angle $\alpha$. This resolver thus solves the triangle drawn in Fig. 3 between points 136, 136' and 168, showing that the potential in coil 166 represents the magnitude of the east-west component of the movement vector 161, and the potential in coil 167 represents the magnitude of the north-south component of 161.

The first step in taking a fix on the lighthouse is to move an observation switch 169, Fig. 1, to its position 1. This connects coil 164 to conductor 171.

The second step is to move a slew switch 172 to one or the other of its two positions. The contact arm 173 of this switch connects conductor 171 to one or the other terminal of the center grounded secondary winding of a transformer 174 which is excited from the alternating current mains 76. Either connection excites the resolver 162, the phase sense being opposed in the two slew switch positions. This switch also through its contact armature 176, in both positions applies direct current from supply terminal 177 to relay coil 88, closing its front contacts and opening its rear contacts. This breaks the two connections between the ocean current resolver 78 and rate servomechanisms 92 and 93. The instrument is thus deprived of correction for ocean currents during the position correction process but this introduces negligible error. The operation of relay 88 also completes the circuits of coils 166 and 167 of resolver 162 as follows: from coil 166 through conductor 178, relay front contact 179, armature 86, and conductor 89 to actuate the east-west rate servomechanism 92. Also the circuit is completed from coil 167 through conductor 181, front contact 182, armature 87, and conductor 91 to actuate north-south rate servomechanism 93. Additionally switch arm 176 applies current through conductor 183 to operate shifting mechanisms in gears 94 and 96, increasing their ratios so that their outputs turn faster. As a result the latitude shaft 29 and the longitude shaft 34 have added to their motions angular velocities which are in the ratio of the lengths of the lines 136—168, Fig. 3, and 168—136' respectively, and which continue as long as the slew switch is maintained on its contact. The slew switch contact is selected which moves the telescope toward the lighthouse and, when observation shows that the telescope points to the lighthouse, the slew switch is opened.

The vessel being at position 157, the telescope direction is now represented by the line 159 and the partially corrected dead-reckoned position is that of point 136'. The angle α, under control of resolver 137, has changed to α', but the change is usually small.

As the third operation, immediately upon completing the above observation the observation switch 169 is moved to position 2. This connects potential to energize a magnetic lock 184 which locks shaft 144' at its then angular deflection representing α'. Further changes in the angular deflection of shaft 144 are stored in storage spring 163, to be applied to shaft 144' after its release. Operation of switch 169 to position 2 also energizes the rotor coil 186 of resolver 162, at right angles to rotor coil 164.

The fourth operation consists of allowing time to elapse until the bearing of the lighthouse 134, Fig. 3, from the vessel has changed materially. It is preferable to wait until the bearing has changed by about 90° to secure the best accuracy, but any change of bearing whatever may be employed. During this elapsed time the course of the vessel need not be linear, but may turn in any way and in any direction without restriction. In Fig. 3 the partly-corrected dead-reckoned course is indicated as the straight line 133' from point 136' to the point 187 where the lighthouse bearing direction is different by about 70° from that of the direction of line 159. Meanwhile the vessel has moved through the actual path 156', parallel to 133' and equal in length, from 157 to 157'. The line 188, from 187 to 157' is therefore parallel to line 159 and at right angles to line 161. It is therefore along this line 188 that the dead reckoned position must now be moved. The telescope points in the direction paralleling the line 187—134, as indicated by line 189, for reasons explained in connection with the first observation.

The fifth operation consists of operating the slewing switch 172, Fig. 1, to whichever side is shown by observation to move the telescope line of sight to the target. This operation again operates relay 88, connecting the output coils of resolver 162 to the rate servomechanisms 92 and 93. However, as the coil 186 is now the primary coil and is spatially at right angles to the coil 164 used before, the trigonometric components are now reversed, so that the coil 166 applies a potential proportional to the sine of α' to the east-west rate servomechanism 92. This potential, and the resulting rate of shaft rotation, are indicated by the length of the line 191, Fig. 3, one component of the line of travel 188. Similarly the coil 167, Fig. 1, now applies a potential proportional to the cosine of α' to the north-south servo 93, represented by the side 192, Fig. 3, of the triangle. The result is accelerated motion of the latitude and longitude shafts to bring the telescope line of sight into the direction of line 193, when the slew switch is released. The latitude counter 56 and the longitude counter 99 now indicate the true position 157' of the vessel. Observation switch 169 is moved to its position 1, releasing shaft 144' and putting the instrument in condition for the next observation.

What is claimed is:

1. A fix corrector for correction of the dead-reckoned position of a craft by direct observation of a known terrestrial object comprising, a first subtracting device actuated in accordance with the dead-reckoned latitude of said craft and the latitude of said object to provide a first voltage representing the latitude difference, a second subtracting device actuated in accordance with the present dead-reckoned longitude of said craft and the longitude of said object and the cosine of the present dead-reckoned latitude to provide a second voltage representing the east-west difference, an arc tangent solver actuated in accordance with said orthogonal first and second voltages and having a shaft positioned by said voltages at an angle representing the arc tangent thereof and the true dead-reckoned bearing of said object, means for subtracting the true heading of said craft from said true bearing to form the dead-reckoned relative bearing of said object, observation means positioned by said last-named means to said dead-reckoned relative bearing of the object, and slewing means for modifying said dead-reckoned latitude and longitude presented to said first and second subtracting devices to cause said observation means to bear on said object and to bring said dead-reckoned position into coincidence with the actual position of the craft.

2. A fix corrector for correction of the dead-reckoned position of a craft by direct observation of a known terrestrial object comprising, a first subtracting device actuated in accordance with the dead-reckoned latitude of said craft and the latitude of said object to provide a first voltage representing the north-south difference in position of the object and craft, a second subtracting device actuated in accordance with the dead-reckoned longitude of said craft and the longitude of said object and the cosine of the dead-reckoned latitude of the craft to provide a second voltage representing the east-west difference in position of the object and craft, an arc tangent solver actuated in accordance with said first and second voltage and having a shaft positioned by said voltages at an angle representing the arc tangent thereof and the true dead-reckoned bearing of said object, a subtracting device for subtracting said angle from the true heading of said craft to form the dead-reckoned relative bearing of said object, observation means positioned by said subtracting device to said relative bearing, a slew switch, and slewing means controlled by said slew switch for adding two consecutive increments of rates of change to said dead-reckoned latitude and longitude proportional to said first and second voltages while observing by means of said observation means to control the sense and duration of use of said slew switch.

3. A fix corrector for correction of the dead-reckoned position of a craft by direct observation of a known terrestrial object comprising, a first subtracting device actuated by a latitude shaft having a deflection representing the dead-reckoned latitude of said craft and by a signal representing the latitude of said object to provide a first voltage representing the north-south difference in position of object and craft, a second subtracting device actuated by a longitude shaft having a deflection representing the dead-reckoned longitude of said craft and by a signal representing the longitude of said object and by the cosine of the dead-reckoned latitude of the craft to provide a second voltage representing the east-west difference in position of object and craft, an arc tangent solver energized by said orthogonal first and second voltages and having a shaft positioned by said voltages at the arc tangent angle thereof representing the dead-reckoned azimuth of said object, a differential synchro subtracting said angle from the true heading of said craft to form the dead-reckoned relative bearing of said object, a telescope positioned by the output signal of said differential synchro to said bearing, a manual slew switch, a resolver controlled by said manual slew switch generating two orthogonal voltages proportional to said first and second voltages, and rate servomechanism controlled by said two orthogonal voltages introducing two consecutive sets of proportional rates of rotation to said latitude and longitude shafts, observations through said telescope providing information for governing the sense and duration of contact of said manual slew switch.

4. A fix corrector for correction by direct observation of a known terrestrial object of a craft's dead-reckoned position represented by angular deflections of latitude and longitude shafts comprising, a first subtracting device including a differential gear and a voltage divider, said device being actuated by said latitude shaft and by a shaft deflection representing the latitude of said object and emitting a first voltage representing the north-south difference in position of object and craft, a second subtracting device including a differential gear, a voltage divider and a cosine generator, said device being actuated by said longitude and latitude shafts and by a shaft deflection representing the longitude of said object and emitting a second voltage representing the east-west difference in position of object and craft, an arc tangent solver including a resolver, a motor and an amplifier, said arc tangent solver being excited by said first and second voltages representing orthogonal vectors and positioning an azimuth shaft to an angular deflection representing the arc tangent thereof and therefore the dead-reckoned azimuth of said object, a differential synchro positioned by said arc tangent deflection and excited by a signal representing craft true heading to emit a signal representing the dead-reckoned relative bearing of said object, a telescope positioned by the signal derived from said differential synchro to said dead-reckoned relative bearing, a manual slew switch, a slew resolver positioned by said azimuth shaft to said dead-reckoned azimuth and excited through said manual slew switch to emit a pair of voltages proportional to said first and second voltages, means including rate servomechanisms for introducing rotational rates to said latitude and longitude shafts orthogonally representative of the effect of ocean currents and tides on said craft, means including a relay for introducing to said latitude and longitude shafts through said rate servomechanisms slew rates representative of said first and second voltages, whereby a first correction is made in said dead-reckoned position and said telescope is rotated to bear on said object in a first observation, an observation switch locking said slew resolver position and reversing the outputs thereof whereby upon operation of said slew switch a second correction orthogonal to said first correction is introduced and said telescope is again rotated to bear on the object in a second observation.

References Cited in the file of this patent

UNITED STATES PATENTS

| | | |
|---|---|---|
| 2,652,979 | Chance | Sept. 22, 1953 |
| 2,762,123 | Schultz et al. | Sept. 11, 1956 |